United States Patent [19]

Tahara

[11] Patent Number: 5,963,256
[45] Date of Patent: Oct. 5, 1999

[54] CODING ACCORDING TO DEGREE OF CODING DIFFICULTY IN CONFORMITY WITH A TARGET BIT RATE

[75] Inventor: Katsumi Tahara, Kanagawa, Japan

[73] Assignee: Sony Corporation, Tokyo, Japan

[21] Appl. No.: 08/775,515

[22] Filed: Jan. 2, 1997

[30] Foreign Application Priority Data

Jan. 11, 1996 [JP] Japan ................................. 8-003008

[51] Int. Cl.⁶ .................................................. H04N 7/24
[52] U.S. Cl. .......................... 348/385; 348/405; 348/423
[58] Field of Search .................................. 348/405, 419, 348/390, 384, 423, 385; 382/251; 704/229, 230

[56] References Cited

U.S. PATENT DOCUMENTS

| | | | |
|---|---|---|---|
| 5,231,484 | 7/1993 | Gonzales | 348/407 |
| 5,497,338 | 3/1996 | Miyake | 364/514 A |
| 5,555,273 | 9/1996 | Ishino | 375/244 |
| 5,579,317 | 11/1996 | Pang | 348/423 |
| 5,608,656 | 3/1997 | Purcell | 364/514 R |
| 5,686,965 | 11/1997 | Auld | 348/423 |
| 5,757,421 | 5/1998 | Kato | 348/405 |
| 5,805,220 | 9/1998 | Keesman | 348/385 |

*Primary Examiner*—Bryan Tung
*Attorney, Agent, or Firm*—Frommer Lawrence & Haug, LLP.; William S. Frommer

[57] ABSTRACT

In multiplexing a plurality of coded data, degrees of difficulty of coding of the data are measured, coding rate for each of the data is decided by allotting a certain target bit rate with a ratio of the each of the measured degrees of difficulty of coding so that the bit rate of the multiplexed data becomes equal to the target bit rate, the data is then coded in response to the decided coding rates, and the coded data is multiplexed before being outputted to a transmission line or recording medium. Thus, the bit rate of the outputted data is always kept at the target value to improve the usage rate of a transmission line.

45 Claims, 12 Drawing Sheets

CODING ACCORDING TO DEGREE OF CODING DIFFICULTY IN CONFORMITY WITH A TARGET BIT RATE

BACKGROUND OF THE INVENTION

1. Field of the Invention

The present invention relates to a coding device, coding method, transmission device, transmission method and recording medium and more particularly relates to a coding device, coding method, transmission device, transmission method and recording medium for coding a plurality of data at different bit rates.

2. Description of the Related Art

FIG. 1 is a block diagram showing an example configuration of a device for coding and then decoding a plurality of data after transmission or recording. In FIG. 1, a coding device 130 codes a plurality of data and then outputs this data. Further, a decoding device 131 then decodes the data coded by the coding device 130 to the original data and then outputs this data.

Video data 100, audio data 101 and other data 102 of the coding device 130 is coded by a video coder 103, audio coder 104 and another coder 105 before being outputted to a multiplexer 109 as elementary streams 106 to 108.

The video coder 103 codes and outputs the video data 100 based on the standards (so-called MPEG (Moving Picture Experts Group) method) shown in, for example, ISO (International Organization for Standardization) 13818-2 and ISO11172-2. Further, the audio coder 104 codes and outputs the audio data 101 based on the standards (MPEG method) shown in ISO13818-3 and ISO11172-3.

The multiplexer 109 time-multiplexes the elementary streams 106 to 108 and outputs a multiplexed bit stream 110 comprising a single string bit stream. This multiplexed bit stream 110 is recorded on a recording medium 111 or transmitted via a transmission path 112 so as to be inputted to a decoding device 131.

At the multiplexer 109, synchronization information not shown in the drawings for this data is also added to the multiplexed bit stream 110 as side information in order to obtain synchronization with the video data 100 and the audio data 101 on the decoding side while the data is being multiplexed.

At a separator 113 of the decoding device 131, the elementary streams 106 to 108 are separated from the multiplexed bit stream 110 and supplied to a video decoder 117, audio decoder 118 and another decoder 119.

The video decoder 117, audio decoder 118 and the other decoder 119 decode the coded data back to the original data and output this data as video data 120, audio data 121 and other data 22. Synchronization is then secured because the video data 120 and the audio data 121 is synchronized and then decoded by the video decoder 117 and the audio decoder 118 so as to correspond with the aforementioned synchronization information.

In the above example an example is shown where programs included for each of the items of video data 100, audio data 101 and other data 102 are multiplexed. With regards to this, an example for the case where a plurality of programs comprising a plurality of data is multiplexed is shown in the following.

FIG. 2 is a block view showing an example configuration of a device for multiplexing, transmitting and recording a plurality of programs comprising a plurality of data. The multiplexing of this kind of plurality of programs is carried out based on, for example, transport stream multiplexing (Transport Stream Multiplexing) standardized in, for example, ISO13818-1 and 11172-1.

In FIG. 2, a coding device 230 outputs a plurality of programs after coding and multiplexing. The decoding device 231 decodes the original data from data coded at the coding device 230.

The programs 200-1 to 200-*n* of the coding device 230 comprises video data 200-1*a* to 200-*na* and audio data 200-1*b* to 200-*nb*. The video data 200-1*a* to 200-*na* is inputted to video coders 201V-1 to 201V-*n*, respectively. Further, the audio data 200-1*b* to 200-*nb* is inputted to audio coders 201A-1 to 201A-*n*, respectively. The video coders 201V-1 to 201V-*n* and the audio coders 201A-1 to 201A-*n* code in such a manner that items of inputted data become of pre-allotted bit rates to be outputted as a video elementary stream and an audio elementary stream.

The video data 200-1*a* to 200-*na* and the audio data 200-1*b* to 200-*nb* multiplexed by the video coders 201V-1 to 201V-*n* and the audio coders 201A-1 to 201A-*n* is inputted to the multiplexer 209 and multiplexed.

The signal multiplexed by the multiplexer 209 is transmitted by the transfer medium 210A or recorded on the recording medium 210B.

A separator 211 of the decoding device 231 reads a time-multiplexed stream from the transfer medium 210A (or the recording medium 210B), separates and extracts the video elementary stream and the audio and the audio elementary stream from this stream and supplies these streams to video decoders 212V-1 to 212V-*n* and audio decoders 212A-1 to 212A-*n*. The video decoders 212V-1 to 212V-*n* and the audio decoders 212A-1 to 212A-*n* decode the coded streams and output the original data. Programs 218-1 to 218-*n* comprised of video data 218-1*a* to 218-*na* and audio data 218-1*b* to 218-*nb* can then be obtained as a result.

These programs 218-1 to 218-*n* are then outputted to the respective corresponding display devices. Information sent from the coding side can therefore be utilized as a result.

In the example shown in FIG. 2, the case where all of the elementary streams are read is shown but decoding by selecting arbitrary elementary streams is also possible.

In the above example, when, for example, a plurality of streams are transmitted by the transfer medium 210A, as shown in FIG. 3, a fixed bit rate is allotted to each elementary stream. In this kind of method, the signal quality falls when the degree of difficulty of coding the target signal is high (when a large amount of information is coded at the coder). Further, coded data becomes redundant when the degree of difficulty of coding becomes low (when the amount of information coded at the coder is small) with the bit stream being used more than is necessary as a result.

As shown in FIG. 4, a method is provided where each of the elementary streams are transmitted (or recorded) at variable bit rates. In this example, the widths of the respective graphs (corresponding to the bit rate) change in response to changes in the degree of difficulty of coding the data because the bit rate is allotted to each of the bit streams in response to the amount of information for this data (a high bit rate is allotted when there is a large amount of information).

An example of a configuration for a coding device for realizing this kind of transmission method is shown in FIG. 5.

In FIG. 5, portions corresponding to portions in FIG. 2 are given the same numerals and the description is omitted as appropriate.

In this example, the video data 200-1a to 200-na is inputted to video coders 306V-1 to 306V-n via rate measurers necessary for video 300v-1 to 300V-n and the audio data 200-1b to 200-nb is inputted to audio coders 306A-1 to 306A-n via rate measurers necessary for audio 300A-1 to 300A-n.

The rate measurers necessary for video 300V-1 to 300V-n and the rate measurers necessary for audio 300A-1 to 300A-n measures the rate (necessary rate) necessary during coding of the video data 200-1a to 200-na and the audio data 200-1b to 200-nb using the tonality etc. showing undulations in the spectral distribution of the input signal. The coding rates of the video coders 306V-1 to 306V-n and the audio coders 306A-1 to 306A-n are then controlled independently based on the measured data.

At this time, it is necessary to ensure that the total for the bit rates for all of the data does not exceed the maximum bit rate for the transfer medium 210A. The maximum bit rate is then allotted to each of the items of data and coding is then carried out so that this maximum bit rate is not exceeded. In this way, the total for the maximum bit rate allotted to each item of data becomes larger than the maximum bit rate of the transmission path but practical problems are few because the probability of a large number of data items of a high degree of coding difficulty occurring at the same time is small.

The video coders 306V-1 to 306V-n and the audio coders 306A-1 to 306A-n code the video data 200-1a to 200-na and the audio data 200-1b to 200-nb at a prescribed bit rate based on the control of the rate measurers necessary for video 300V-1 to 300V-n and the rate measurers necessary for audio 300A-1 to 300A-n. The coded items of data and the coded rate information are supplied to the multiplexer 312, time coded based on each item of coding rate information and outputted to the transfer medium 210A (or the recording medium 210B).

In this example, there is little noticeable deterioration or redundant consumption of the stream because the bit rates are allotted in response to the amount of information for each elementary stream.

However, in the aforementioned example, coding is carried out at each of the coders independently. It is therefore possible that the coded data will exceed the maximum bit rate for the transfer medium 210A when a number of items of data for which the degree of difficulty of coding is very high occur, even though the probability of this is low.

In order to prevent this, making the aforementioned maximum bit rate value allotted to each of the items of data small has been considered. However, if the maximum bit rate is made small, the quality of data for which a bit rate which exceeds this maximum bit rate is necessary falls.

On the other hand, the multiplexing rate for the multiplexed data becomes extremely small with respect to the maximum bit rate of the transfer medium 210A when a large amount of data for which the degree of difficulty of coding is extremely low appears so that coding can be carried out at each of the coders independently. In this case, the transfer capability of the transfer medium is not used to it's maximum limit and redundancy therefore occurs.

In order to resolve the aforementioned situation, the present invention is such that the bit rate for each item of data does not exceed the maximum bit rate of the transfer medium 210A or the recording medium 210B when a plurality of data is transmitted or recorded and the allotting of the most appropriate bit rates to each item of data is possible.

SUMMARY OF THE INVENTION

Therefore, according to the present invention, a coding device for coding a plurality of data using one or more prescribed coding systems, multiplexing, and then outputting a plurality of the coded data comprises a measurer, a decider, an encoder and a multiplexer. The measurer is for measuring degrees of difficulty of coding a plurality of the data. The decider is for deciding coding rates for a plurality of the data in accordance with a target bit rate and the degrees of difficulty of coding for a plurality of the data in such a manner that the bit rate of the output data becomes equal to the target bit rate. The encoder is for coding a plurality of the data in response to each of the decided coding rates and the multiplexer is for multiplexing a plurality of the data coded by the encoder.

Further, according to the present invention, a coding method for coding a plurality of data, multiplexing, and then outputting a plurality of the coded data, comprises a measuring step, deciding step, coding step and multiplexing step. The measuring step is for measuring degrees of difficulty of coding a plurality of the data. The deciding step is for deciding coding rates for a plurality of the data in accordance with a target bit rate and the degrees of difficulty of coding for a plurality of the data in such a manner that the bit rate of the output data becomes equal to the target bit rate. The coding step is for coding a plurality of the data in response to each of the decided coding rates. The multiplexing step is for multiplexing a plurality of the data coded in the coding step.

Moreover, according to the present invention, a transmission device for coding a plurality of data using one or more prescribed coding systems, multiplexing, and then transmitting a plurality of the coded data comprises a measurer, a decider, an encoder, a multiplexer and a transmitter. The measurer is for measuring degrees of difficulty of coding a plurality of the data. The decider is for deciding coding rates for a plurality of the data in accordance with a target bit rate and the degrees of difficulty of coding for a plurality of the data in such a manner that the bit rate of the output data becomes equal to the target bit rate. The encoder is for coding a plurality of the data in response to each of the decided coding rates. The multiplexer is for multiplexing a plurality of the data coded by the encoder. The transmitter is for transmitting this multiplexed data.

Still further, according to the present invention, a transmission method for transmitting a plurality of data, which are coded and multiplexed before being transmitted comprises measuring, deciding, coding, multiplexing and transmission steps. The measuring step is for measuring degrees of difficulty of coding a plurality of the data. The deciding step is for deciding coding rates for a plurality of the data in accordance with a target bit rate and the degrees of difficulty of coding for a plurality of the data in such a manner that the bit rate of the output data becomes equal to the target bit rate. The coding step is for coding a plurality of the data in response to each of the decided coding rates. The multiplexing step is for multiplexing a plurality of the data coded in the coding step. The transmission step is for transmitting the multiplexed data.

In the coding device, coding method, transmission device and transmission method of the present invention, a plurality of the data can include at least a plurality of video data and can further include audio data.

Further, the prescribed coding system can be a Moving Picture Experts Group system.

Moreover, the coding rates of each of a plurality of the data can be decided by allotting the target bit rate with a ratio of the degree of difficulty of coding for the each of a plurality of the data to a cumulative addition of the degrees of difficulty of coding.

The degrees of difficulty of coding for the video data can be measured by the measurers or in the measuring steps in Group Of Picture unit and the degrees of difficulty of coding can be an amount of codes when the video data is coded at a prescribed quantization step size. The degrees of difficulty of coding for the video data can be also a cumulative addition of the squares of coding target pixel values or difference values of the coding target pixel values for the video data. Further, the degrees of difficulty of coding for the video data can be a cumulative addition of the coding target pixel values or absolute values of difference values of the coding target pixel values for the video data.

Still further, the degrees of difficulty of coding for the audio data can be measured by the measurer or in the measuring step in audio frame unit. The degrees of difficulty of coding for the audio data can be an amount of codes when the audio data is coded at prescribed quantization step sizes.

Moreover, according to the present invention, a method of providing a multiplexed data of a plurality of data for being recorded in a recording medium which stores coded data including the multiplexed data as being decodable comprises measuring, deciding, coding, multiplexing and outputting steps. The measuring step is for measuring degrees of difficulty of coding a plurality of the data. The deciding step is for deciding coding rates for a plurality of the data in accordance with a target bit rate and the degrees of difficulty of coding for a plurality of the data in such a manner that a bit rate of the data to be recorded in the recording medium becomes equal to the target bit rate. The coding step is for coding a plurality of the data in accordance with a prescribed coding system in response to each of the decided coding rates. The multiplexing step is for multiplexing a plurality of the data coded in the coding step. The outputting step is for outputting the multiplexed data for being recorded in the recording medium.

DETAILED DESCRIPTION OF THE PREFERRED EMBODIMENTS

First Embodiment

Figure 5:
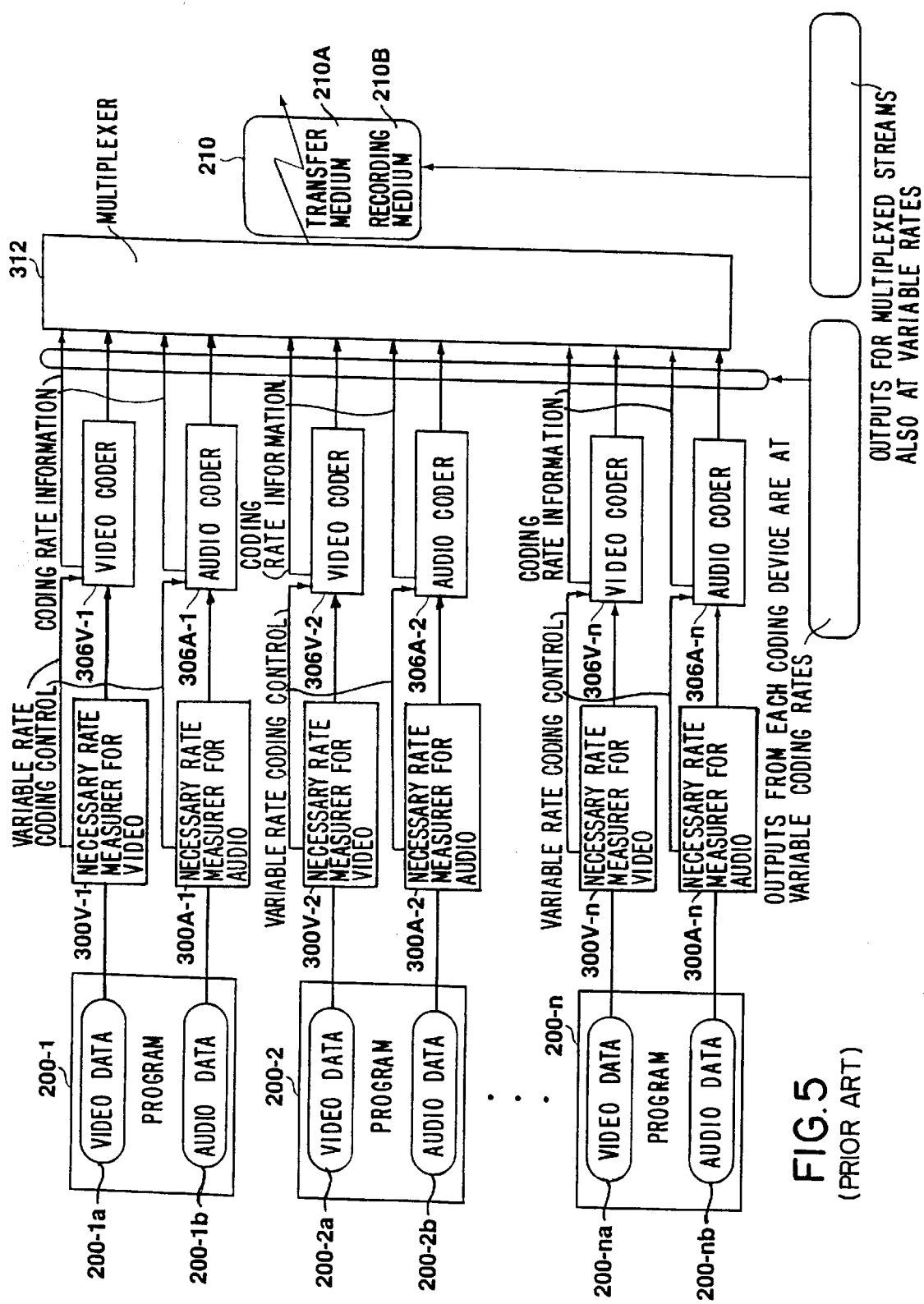
FIG. 5 is a view showing an example configuration of a device for transmitting data at the variable bit rates shown in FIG. 4.
Figure 6:
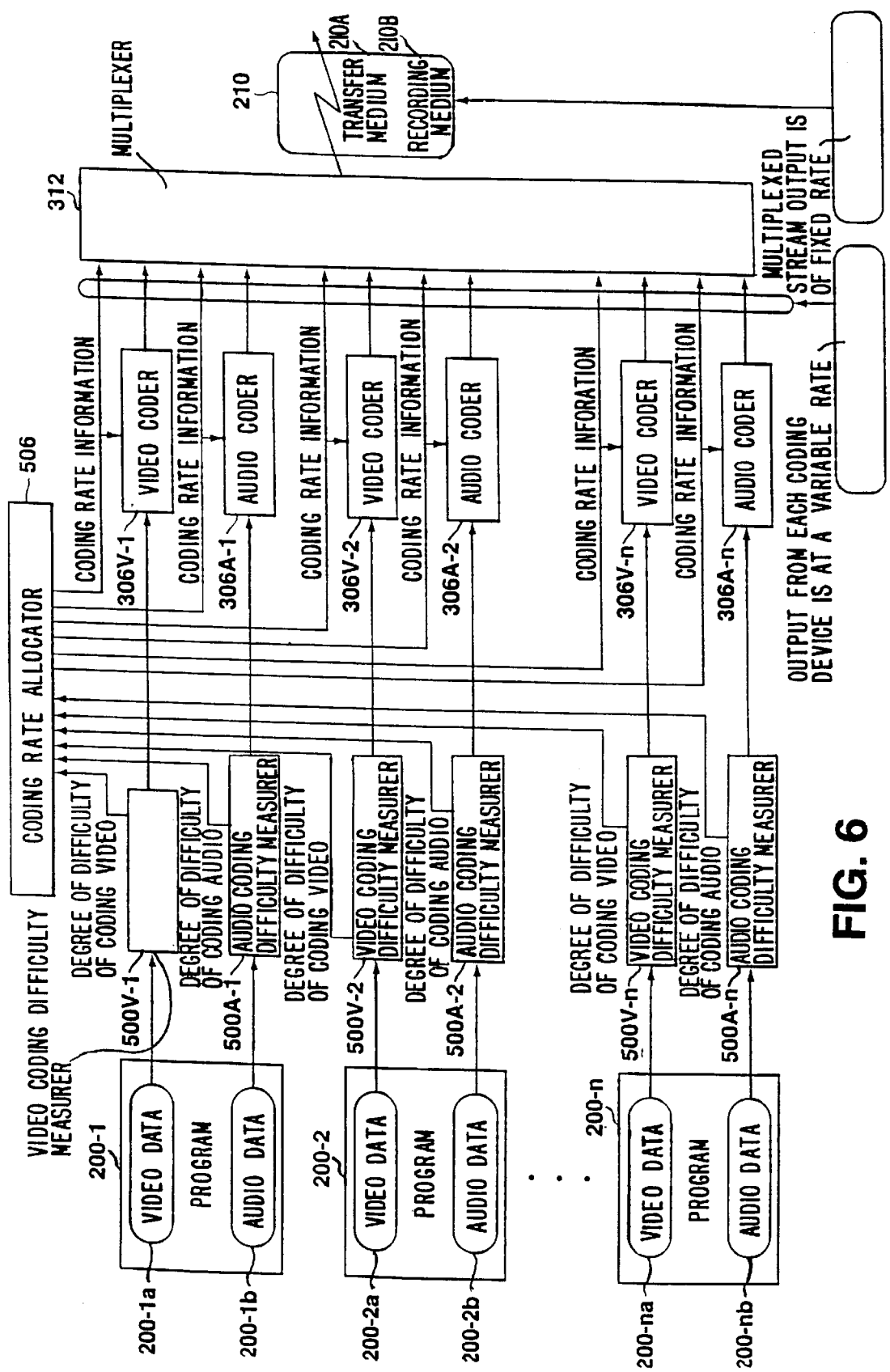
FIG. 6 is a block diagram showing an example configuration of the coding device of the present invention.

FIG. 6 is a block view of an example configuration of a coding device of the present invention. In FIG. 6, portions corresponding to portions in FIG. 5 are given the same numerals and their description is omitted.

In this embodiment, video coding difficulty measurers 500V-1 to 500V-$n$ (measuring means), audio coding difficulty measurers 500A-1 to 500A-$n$ (measuring means) and a coding rate allocator 506 (control means) are added to the example in FIG. 5. Other aspects of the configuration are the same as the case in FIG. 5.

The video coding difficulty measurers 500V-1 to 500V-$n$ measure the difficulty of coding the video data 200-1$a$ to 200-$na$. The audio coding difficulty measurers 500A-1 to 500A-$n$ measure the difficulty of coding 200-1$b$ to 200-$nb$.

The coding rate allocator 506 decides the bit rates allotted to each of the elementary streams in response to the degrees of difficulty of coding provided from the video coding difficulty measurers 500V-1 to 500V-$n$ and the audio coding difficulty measurers 500A-1 to 500A-$n$. The decided bit rates are then supplied to video coders 306V-1 to 306V-$n$ (coding means) and audio coders 306A-1 to 306A-$n$ (coding means)

Figure 7:
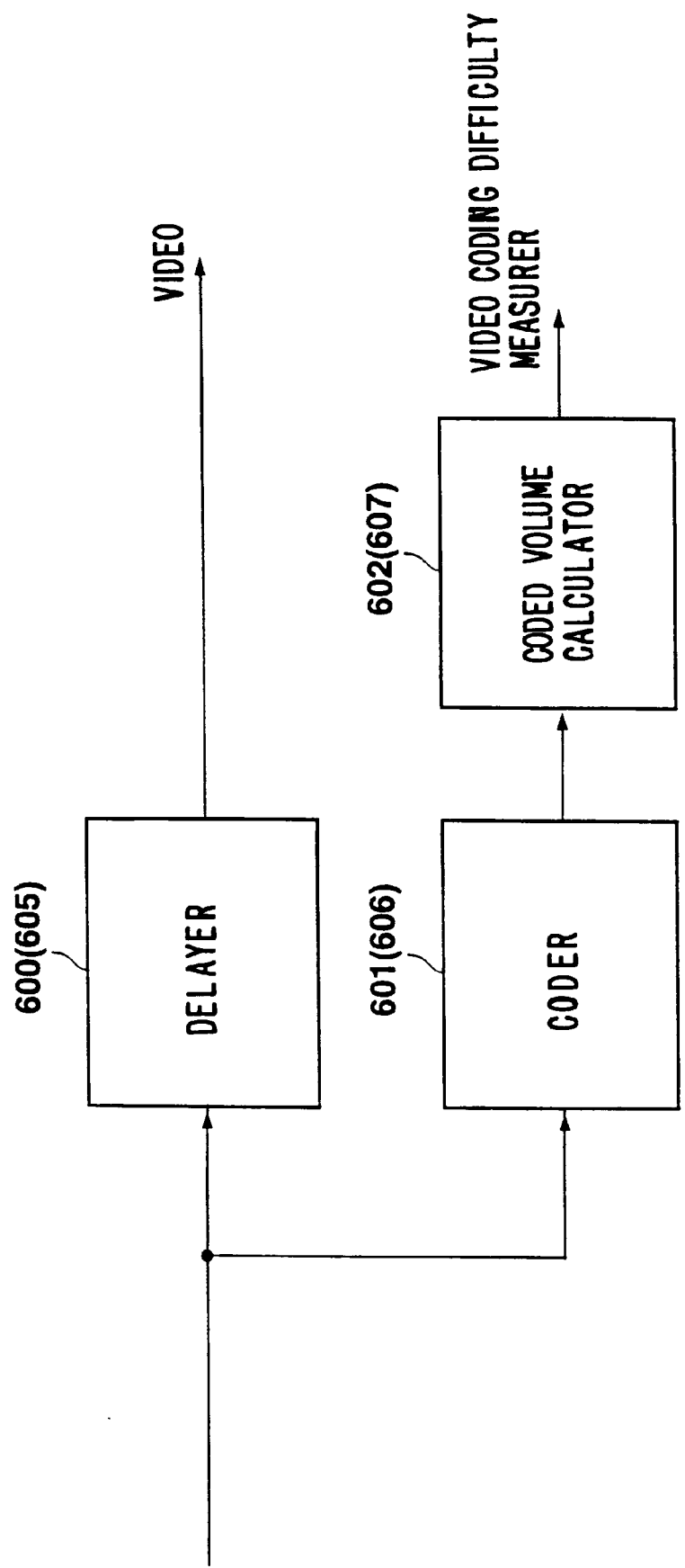
FIG. 7 is a block diagram showing an example configuration of the coding degree of difficulty measurer of FIG. 6.

FIG. 7 is a block diagram showing an example of the detailed configuration of the video coding difficulty measurer 500V-1 (the remaining video coding difficulty measurers 500V-2 to 500V-$n$, and the audio coding difficulty measurers 500A-1 to 500A-$n$ also have the same configuration).

In FIG. 7, a delay part 600 delays (stores) the inputted video data 200-1$a$ by just the GOP (Group of Pictures) portion and then outputs this data. A coder 601 quantizes the inputted video data 200-1$a$ in prescribed quantization steps (for example, Stepsize=2) and then outputs this data. An coded volume calculator 602 adds up the coded amounts of data (data volumes) outputted from the coder 601 and outputs this as the degree of difficulty of coding.

Next, the operation of the video coding degree of difficulty measurer the embodiment will be described.

Video data 200-1$a$ to 200-$na$ and audio data 200-1$b$ to 200-$nb$ comprising programs 200-1 to 200-$n$ is supplied to the video coding difficulty measurers 500V-1 to 500V-$n$ and the audio coding difficulty measurers 500A-1 to 500A-$n$.

The inputted video data 200-1$a$ is delayed by one GOP period at the video coding difficulty measurer 500V-1 shown in FIG. 7 and outputted. These signals are then supplied to the video coder 306V-1.

Data supplied to the coder 601 is coded in quantization steps of, for example, Stepsize=2, with the coded data then being supplied to the coded volume calculator 602. The coded volume calculator 602 then adds up the coded volumes for the inputted data across the GOP and these results are outputted.

When the first data for the GOP is inputted at the coded volume calculator 602 calculations commence and these calculations then finish when the data for the last GOP is inputted, with the calculation results then being outputted i.e. it takes the time for 1 GOP until calculation results are outputted. The delay part 600 then delays the video data 200-1$a$ by one GOP portion and the timing is adjusted.

Further, an example of the detailed configuration of the audio coding difficulty measurer 500A-1 (the configuration is the same for the other audio coding difficulty measurers 500A-2 to 500A-n) is also described using FIG. 7. The audio coding difficulty measurer 500A-1 also basically comprises a delay part 605, a coder 606 and a coding amount calculator 607 but as the internal construction of each of the parts differs to those for the video coding difficulty measurers, the reference numerals for each part are changed and are described in detail in the following.

In FIG. 7 the delay part 605 delays (accumulates) the inputted audio data 200-1b by just an audio frame portion and then outputs this data. This audio frame comprises a set of samples of about, for example, 20 to 30 msecs. The coder 606 quantizes the inputted audio data 200-1b in prescribed quantization steps (for example, Stepsize=2) in such a manner as to output the coded data. The coding amount calculator 607 adds up the coding amount (data amount) for the coded data outputted from the coder 606 in audio frame units and outputs this as the degree of difficulty of coding.

Next, a description is given of the operation of the embodiment of this audio coding difficulty measurer.

The audio data 200-1b to 200-nb comprising part of the program 200-1 to 200-n is supplied to the audio coding difficulty measurers 500A-1 to 500A-n.

Figure 1:
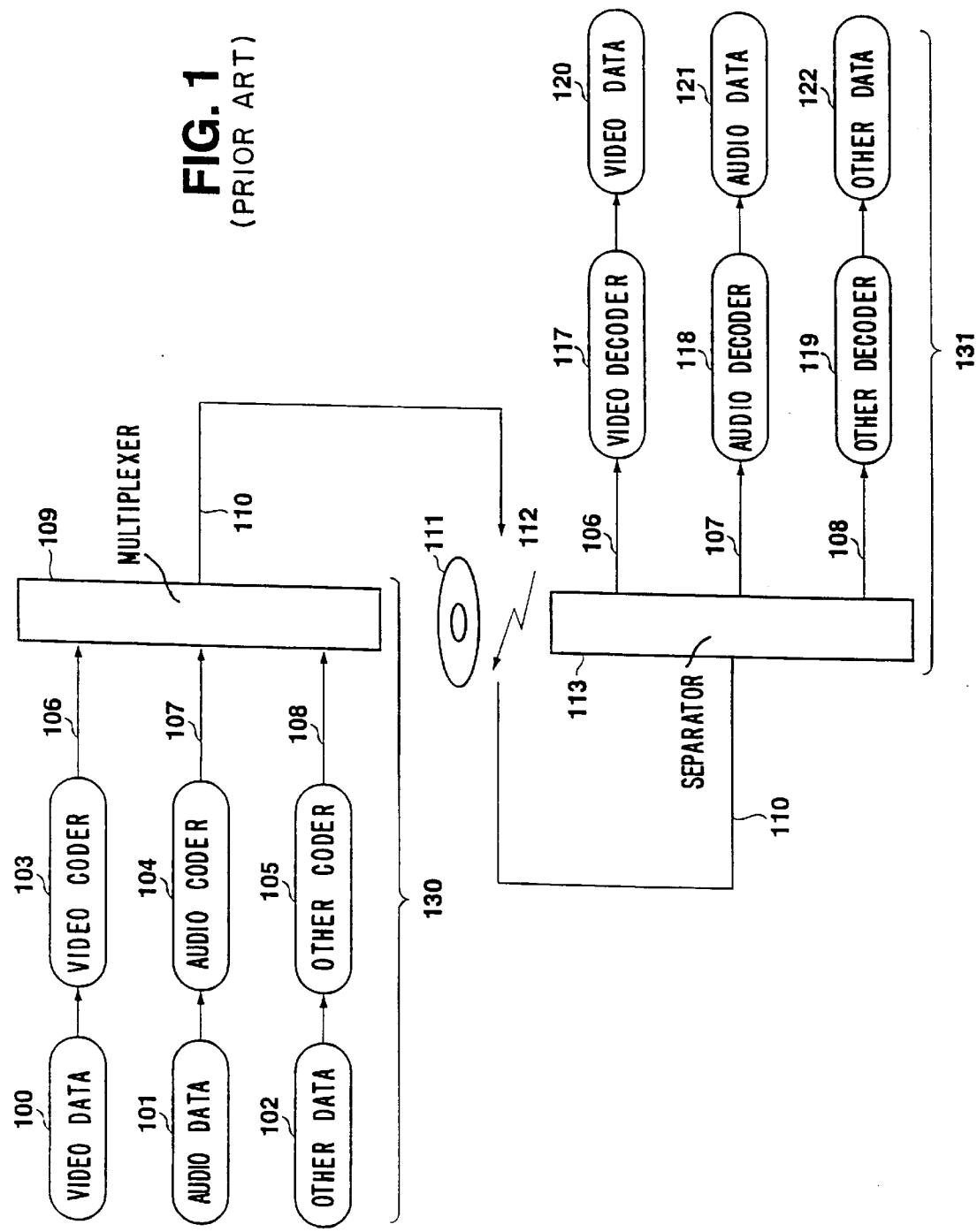
FIG. 1 is a block diagram showing example configurations of conventional coding and decoding devices.
Figure 2:
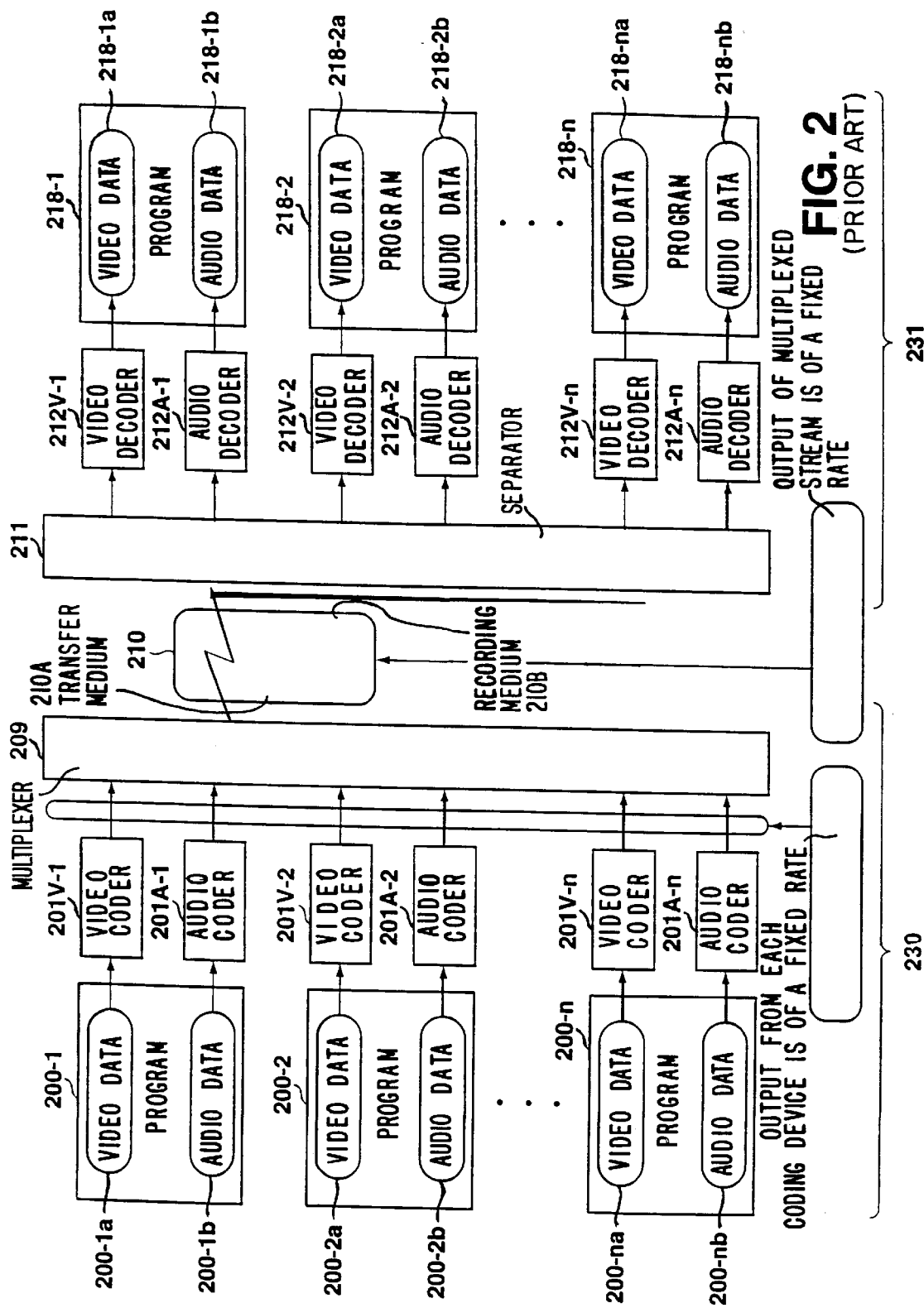
FIG. 2 is a block diagram showing examples of further configurations of conventional coding and decoding devices.
Figure 3:
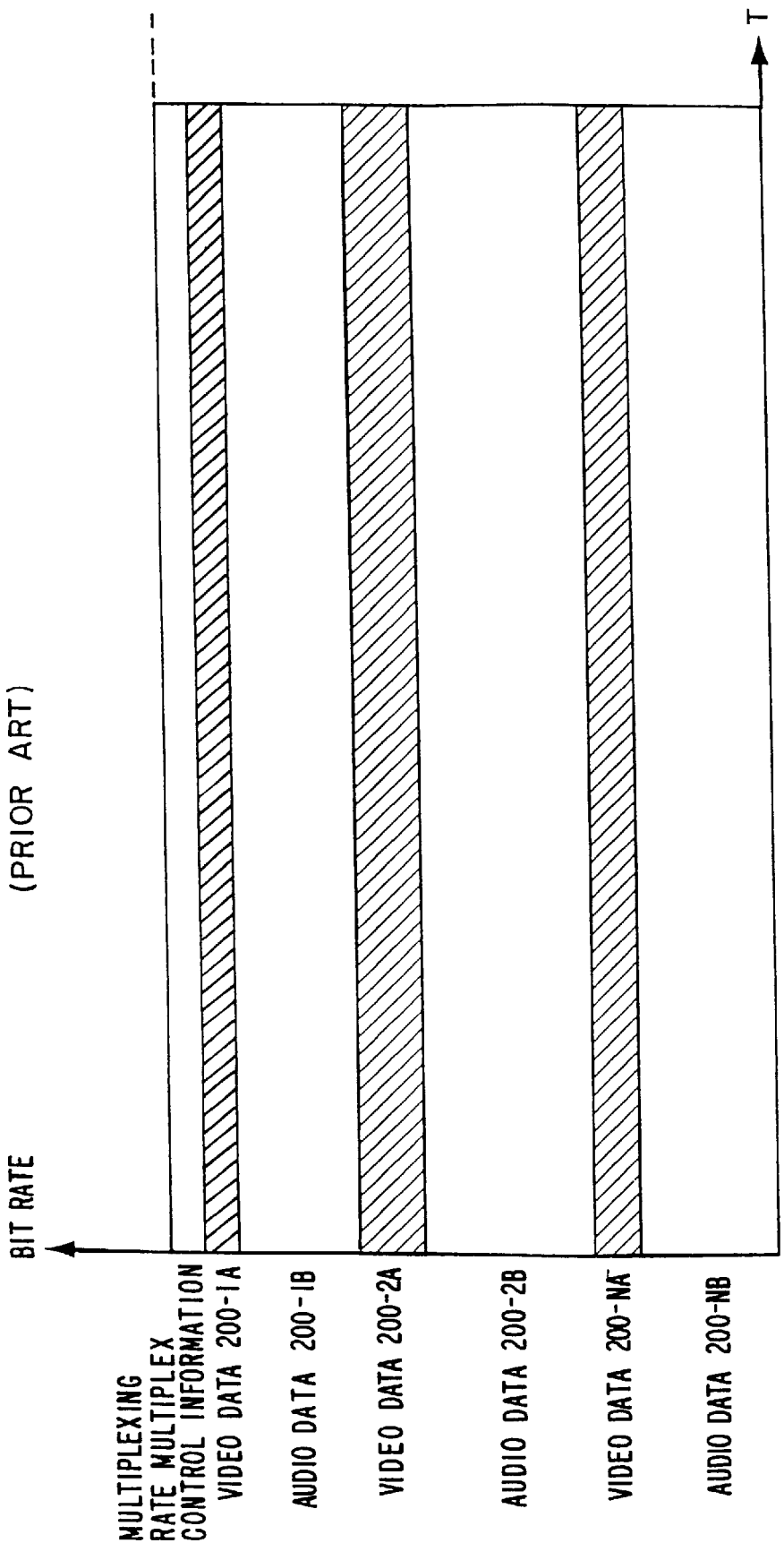
FIG. 3 is a view showing changes with respect to time in each of the bit rates for each of the elementary streams occurring in the example of FIG. 2.
Figure 4:
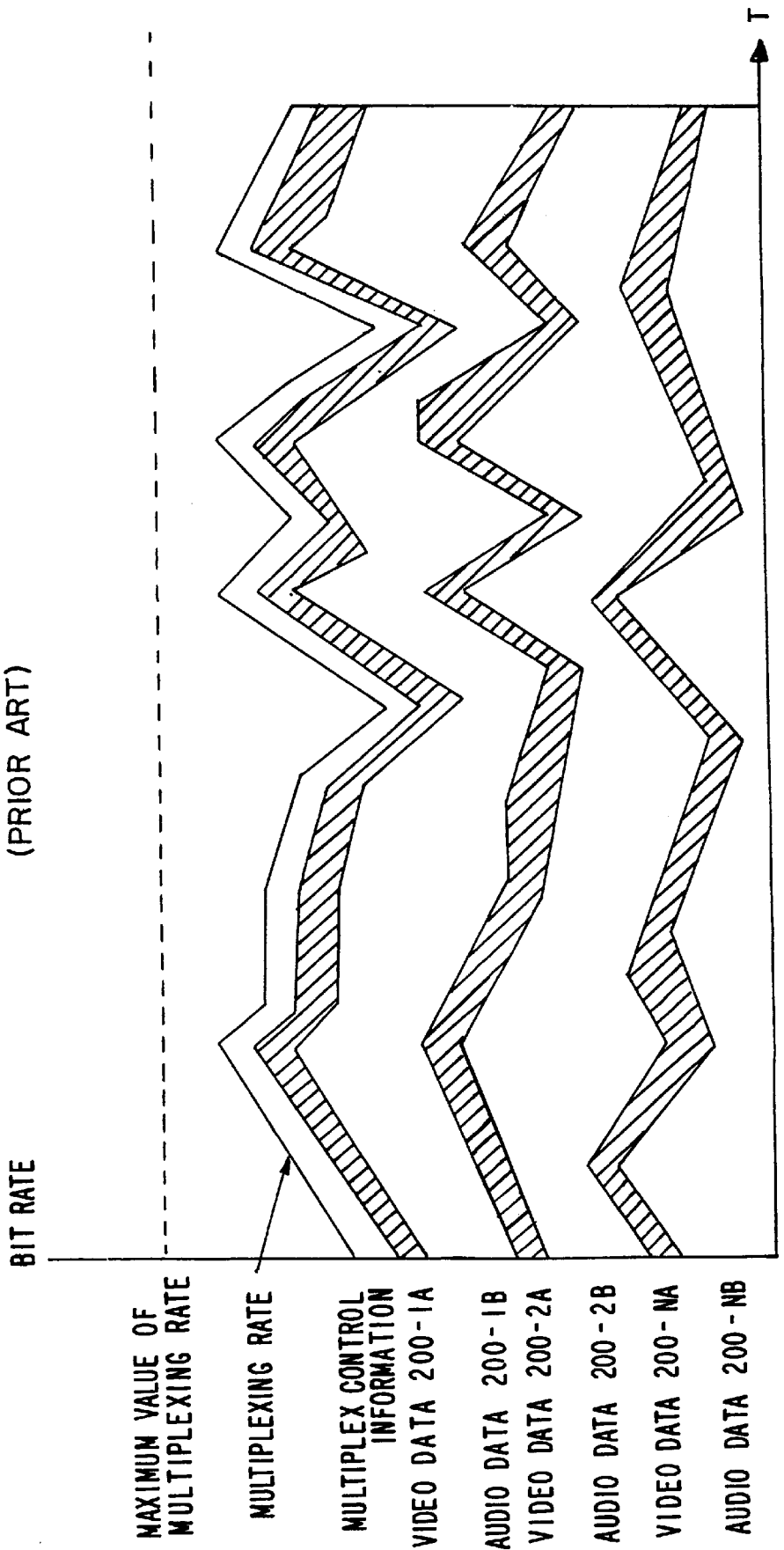
FIG. 4 is a view showing changes with respect to time in the bit rates of each of the elementary streams when data is transmitted at variable bit rates.

The inputted audio data 200-1b is then delayed by just one audio frame portion at the delay part 605 of the audio coding difficulty measurer 500A-1 shown in FIG. 2 and outputted. These signals are then supplied to the audio coder 306A-1.

The audio data supplied to the coder 606 is coded using, for example, quantization steps of Stepsize=6, with the coded data then being supplied to the coding amount calculator 607. The coding amount calculator 607 then totals the amount of code for the inputted data across the audio frame and outputs the results.

The coding amount calculator 607 starts calculations when the first coded data for the audio frame is inputted with the calculations ending when the coded data for the final audio frame is inputted and the calculation results being outputted i.e. the time until the calculation results are outputted is the time for one audio frame. The delay part 605 delays the audio data 200-1b by one audio frame and the timing is adjusted.

The coding rate allocator 506 reads the video and audio coding difficulties supplied from the video coding difficulty measurers 500V-1 to 500V-n and the audio coding difficulty measurers 500A-1 to 500A-n, with the necessary bit rates for these items of data being calculated using the following equation.

[Equation 1]

$$\text{Bitrate } [k][T] = \frac{\text{Difficulty } [k][T]}{\sum_{i=1}^{U} \text{Difficulty } [i][T]} \times \text{MUX\_rate} \quad (1)$$

Here, Bitrate [k] [T] is a bit rate allotted to the kth elementary stream (for example, the video data 200-1a to 200-na are taken as the first to third items of data and the audio data 200-1b to 200-nb is taken as the fourth to sixth items of data) occurring at a time T for each GOP. The difficulty [k] [T] shows the degree of difficulty of coding occurring at a time T for the ith ($1 \leq i \leq u$: where u is the number of elementary streams) elementary stream. Further, MUX_rate shows the data rate (maximum data rate) at which the multiplexed stream is provided.

As shown in equation (1), the bit rate allotted to the kth elementary stream occurring at time T is equal to the degree of difficulty of coding the kth elementary stream occurring at time T (corresponding to the numerator of equation (1)) divided by the cumulative addition of the degrees of difficulties for all of the elementary streams (corresponding to the denominator of equation (1)) multiplied by the MUX_rate.

In other words, the calculation shown in equation (1) shows that the MUX_rate (maximum data rate) is distributed in proportion to the degree of difficulty (Difficulty) of coding the elementary streams at a time T. The coding rate allocator 506 then provides coding rate information (bit rate information) to the video coders 306V-1 to 306V-n, the audio coders 306A-1 to 306A-n, and a multiplexer 312 (combining means, output means) based on the Bitrate [k][T] obtained using this equation.

The video coders 306V-1 to 306V-n and the audio coders 306A-1 to 306A-n code data supplied from the video coding difficulty measurers 500V-1 to 500V-n and the audio coding difficulty measurers 500A-1 to 500A-n based on coding rate information supplied by the coding rate allocator 506.

At this time, the data provided from the video coding difficulty measurers 500V-1 to 500V-n and the audio coding difficulty measurers 500A-1 to 500A-n is delayed as described above by the delay part 600 by just one GOP portion. Further, coding rate information provided from the coding rate allocator 506 is information for the GOP currently stored in the delay part 600. The video data 200-1a to 200-na for one GOP portion of video data 200 stored in the delay part 600 and the audio data 200-1b to 200-nb is coded by the video coders 306V-1 to 306V-n and the audio coders 306A-1 to 306A-n based on the coding rate obtained from the stored data using an MPEG method.

The one GOP portion of video data 200-1a to 200-na accumulated at the delay part 600 and the audio data 200-1b to 200-nb accumulated at the delay part 605 is therefore coded using, for example, an MPEG method by the video coders 306V-1 to 306V-n and the audio coders 306A-1 to 306A-n based on coding rates obtained from this accumulated data.

The coded video data 200-1a to 200-na (video elementary streams) and the audio data 200-1b to 200-nb (audio elementary streams) are supplied to the multiplexer 312 together with coding rate information. The multiplexer 312 then time-multiplexes this data based on the coding rate information and outputs this to a transfer medium 210A (and/or a recording medium 210B).

Next, the case of outputting data outputted from the multiplexer 312 to the transfer medium 210A and/or the recording medium 210B as a signal transport stream multiplexed in the manner described in ISO13818 and 11172-1.

Figure 8:
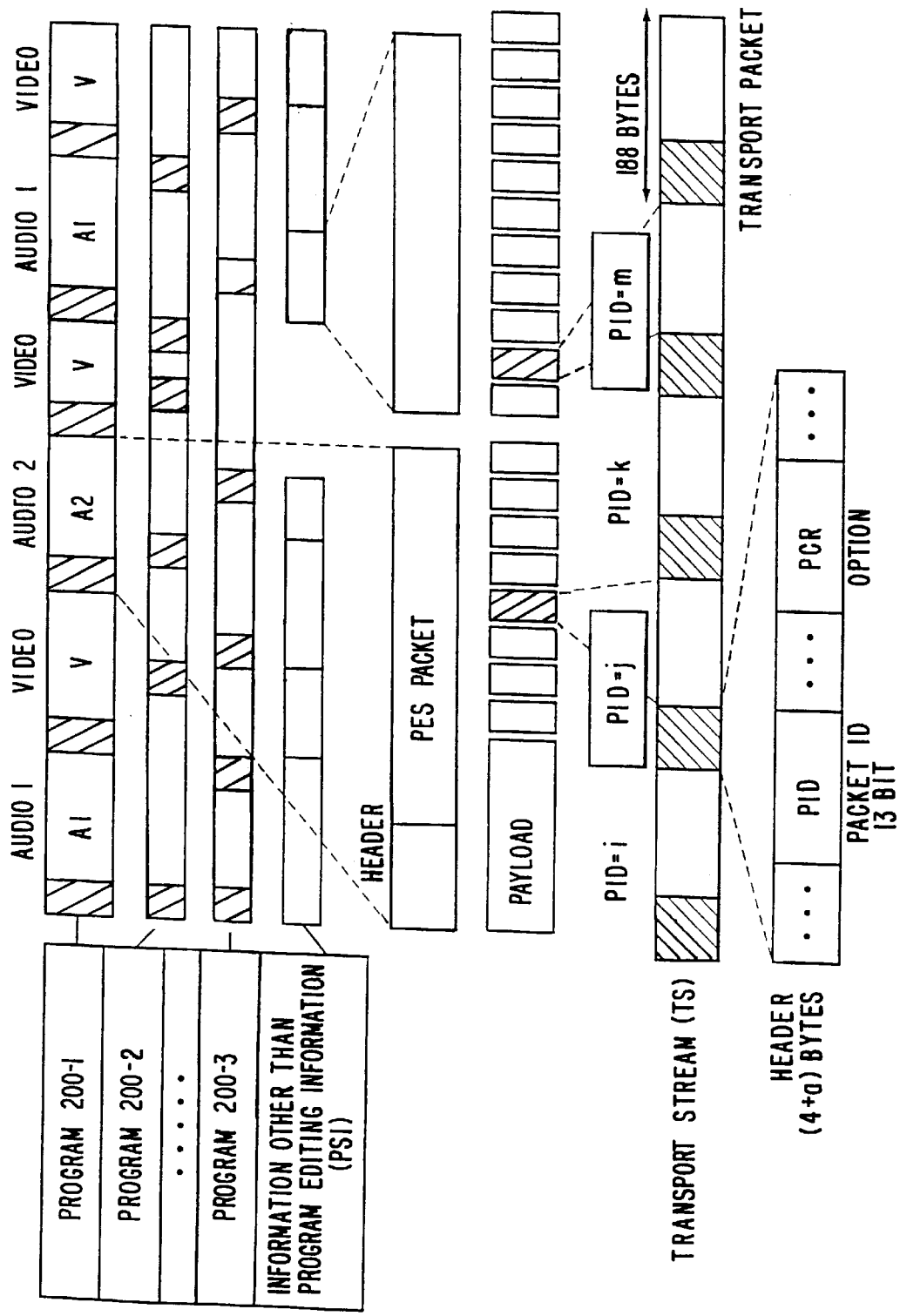
FIG. 8 is a view showing the configuration of the PES packet and the transport stream.

FIG. 8 is a view showing an example structure for a transport stream. The video and audio elementary streams (corresponding to video data 200-1a to 200-na and audio data 200-1b to 200-nb) comprising each of the programs (programs 200-1 to 200-n) are put into packet form as PES (Packetized Elementary Stream) packet units. For example, the video elementary stream (corresponding to the video data 200-1a) comprising the program 200-1 is put into packet form as a video PES packet (V). Further, the audio elementary stream (corresponding to audio data 200-1b) is, for example, separated into streams corresponding to stereo left and right channels and put into packet form as an audio PES packet 1 (A1) and an audio PES packet 2 (A2).

The PES stream comprising this video PES packet and the audio PES packets 1 and 2 is also further divided into a plurality of transport packets. A header is then given to each of the transport packets so as to be transported at a total byte length of 188 bytes. This header comprises (4+a) bytes (where a is an adaptation field byte number) comprising a 13 bit PID (Packet Identification) showing the attributes of the individual streams and a program time standard reference value PCR (Program Clock Reference) etc.

Program editing information (PSI; Program Specific Information) showing the combinations etc. of the elementary streams comprising each program is also inserted as transport packets to be transported together with the other data while the transport stream (TS) comprised of the 188 byte length transport packets are being generated.

Next, a description will be given with respect to the receiving side (decoding device). Multiplexed streams transmitted using the above data configuration are separated into elementary streams using the separating device shown in FIG. 9. The separating device shown in FIG. 9 is a virtual ideal decoder model and is referred to as a Target System Decoder for Transport (T-TSD).

Figure 9:
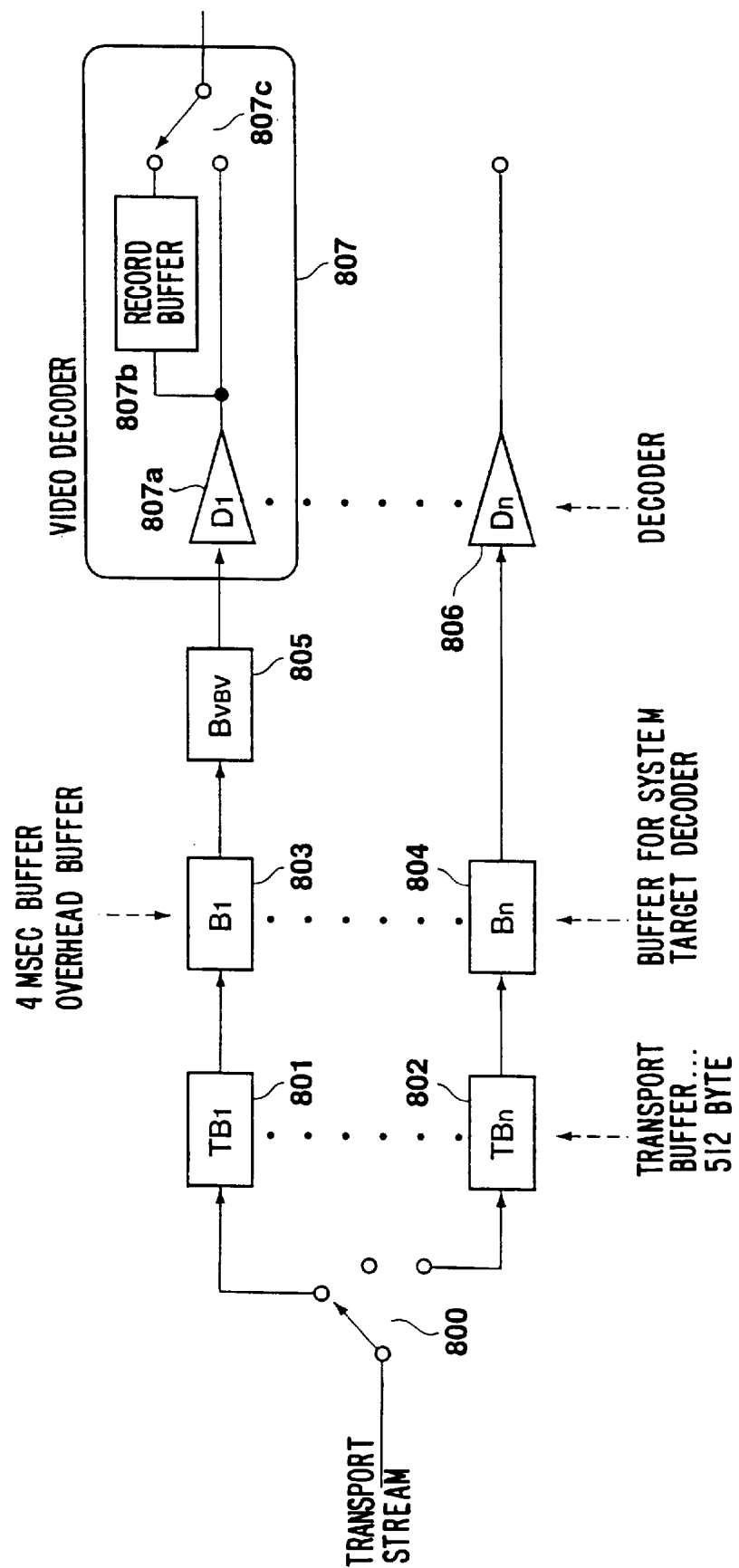
FIG. 9 is a block diagram showing an example of the configuration of the decoding device.

In FIG. 9, a switch 800 is a schematic representation of the separating circuit, with each of the elementary streams being separated and extracted from the inputted time multiplexed transport streams. Transport buffers ($TB_1$, $TB_n$ (where n shows the elementary stream number)) 801 and 802 absorb packet jitter. Buffers ($B_1$, $B_n$) 803 and 804 for system target decoding use are main buffers for storing and outputting prescribed data.

The buffer 803 for the system target decoder is a buffer for video elementary stream use and can absorb 4 ms of jitter. Similarly, a buffer (BVBV) 805 is a buffer for video use that stores and outputs a prescribed amount of video data. In particular, this buffer (BVBV) for elementary stream use is defined within standards relating to video signals within the MPEG system.

A decoder (Dn) 806 is for decoding the elementary stream back to the original data. However, the decoder (Dn) 806 decodes the video elementary stream other than that coded on the basis of the MPEG method or the audio elementary stream back to the original video data or audio data. A video decoder 807 also decodes the video elementary stream back to the form of the original data. The video decoder 807 comprises a decoder 807a, a recorder buffer 807b for obtaining synchronization with other data and a changeover switch 807c.

The inputted transport stream (refer to FIG. 8) inputted for this embodiment separates the respective elementary streams using the switch 800. Namely, the transport stream is separated into the video and audio elementary streams comprising this transport stream. The respective elementary streams are then supplied to the 512 byte transport buffers 801 and 802.

At this time, the elementary streams provided from the switch 800 to each of the transport buffers 801 and 802 are separated and extracted using multiplexed streams that are single string bit streams. Data is therefore supplied intermittently (in bursts) from the switch 800 to each of the transport buffers 801 and 802.

Each of the element streams outputted from the transport buffers 801 and 802 are inputted to system target decoder buffers 803 and 804 and outputted after a prescribed amount of stream data has been accumulated.

Elementary streams outputted from the system target decoder buffer 803 are video elementary streams and are inputted to the buffer 805 for video elementary stream use. On the other hand, the elementary stream outputted from the system target decoder buffer 804 are inputted to the decoder 806, decoded to the original data and outputted.

Video elementary streams outputted from the buffer 805 for video elementary stream use are inputted to the video decoder 807. The video elementary stream inputted to the video decoder 807 is decoded into the original video data by the decoder 807a. The decoded data is then supplied to the recorder buffer 807b and the changeover switch 807c, respectively.

When the inputted multiplexed stream only comprises a video elementary stream (not including the case of an audio elementary stream), data outputted from the decoder 807a is directly outputted via the changeover switch 807c. Further, when the multiplexed stream comprises a video elementary stream and an audio elementary stream, it is necessary to obtain synchronization between the video data and the audio data. The output of the decoder 807a is therefore accumulated at the recorded buffer 807b and outputted via the changeover switch 807c after synchronization has been obtained with the audio data. Information for obtaining this synchronization can be referred to as a Presentation Time Stamp (PTS) and this can be carried out by side information added to the multiplexed stream.

When data is sent and received between a coding device on the data transmitting side and a decoding device on the data receiving side, it is necessary to ensure that the amount of data sent from the coding side does not exceed the amount of data that can be processed by the decoding device. In this embodiment, the coding device transmits data in such a manner that the buffers (transport buffers 801, 802, system target decoder buffers 803 and 804 and the buffer 805 for video elementary stream use etc.) existing at the decoding device do not overflow.

At this time, the data rate (speed of transferring data) for transferring multiplexed streams from the transmitting side to the receiving side is referred to as the MUX_rate as described above, and is a transmission rate that is higher than the average rates of the elementary streams comprising all of the programs added together.

Figure 10:
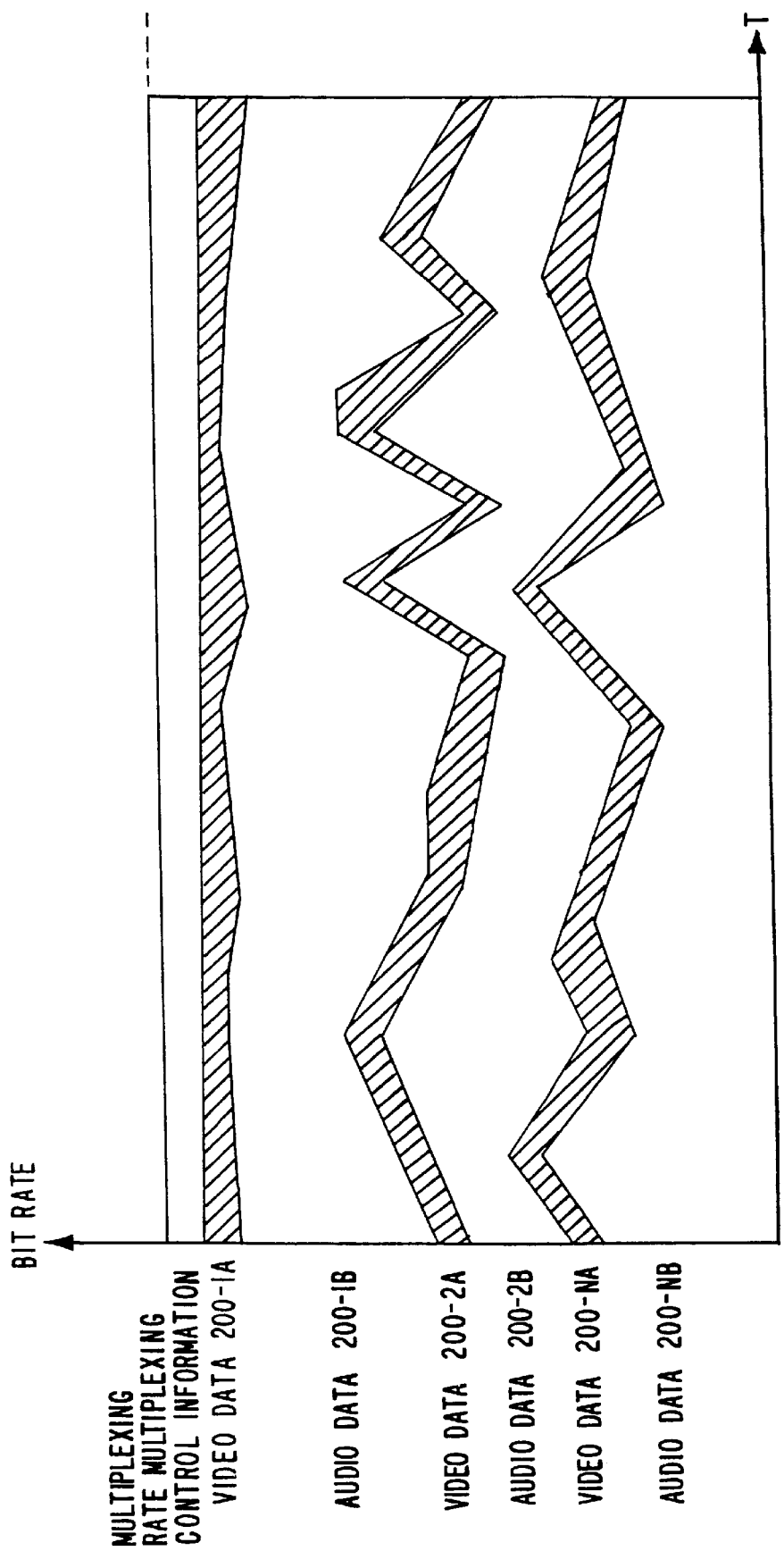
FIG. 10 is a view showing changes with respect to time of the bit rates of the elementary streams included in the multiplexed stream outputted by the coding device shown in FIG. 6.

FIG. 10 shows the situation where the GOP unit bit rates for elementary streams transmitted from the transmission side (coding device) to the receiving side (decoding device) change with respect to time. The horizontal axis of FIG. 10 expresses the time T and the vertical axis shows the bit rates allotted in GOP units to the elementary streams. Further, the multiplexed control information is information showing the GOP unit bit rates of each of the elementary streams.

Transmission rates are allotted to the video data 200-1a to 200-na and the audio data 200-1b to 200-nb in accordance with the Bitrate [k] [T] shown in equation (1). Namely, when the degree of difficulty (Difficulty) for the respective data is high a high bit rate is allotted and when the degree of difficulty of coding is low, a small bit rate is allotted. This is then set so that the total of these bit rates is always fixed ($\leq$ MUX_rate).

High bit rates are therefore allotted to information of a high degree of difficulty of coding so that it is possible to transfer information without the quality of the data falling. Further, it is also possible to transfer information with a low level of redundancy because few bits are allotted to information of a low degree of difficulty of coding. The total of the bit rates for each of the elementary streams therefore does not exceed the maximum bit rate for the transfer medium 210A (or the recording medium 210B) because this information is always set so as to become fixed.

According to the above embodiment, it is therefore possible to perform transmissions without the quality of a plurality of data being dramatically influenced using the maximum bit rate for the transmission path in the most effective manner.

In the above embodiment, the video coding difficulty measurers 500V-1 to 500V-n and the audio coding difficulty measurers 500A-1 to 500A-n for the coding device obtain coding amount when the data is quantized using prescribed quantization steps and this is used as the coding difficulty. However, the coding difficulty can also be obtained based on the coding target pixel value when the difficulty relating to the video data is measured.

Figure 11:
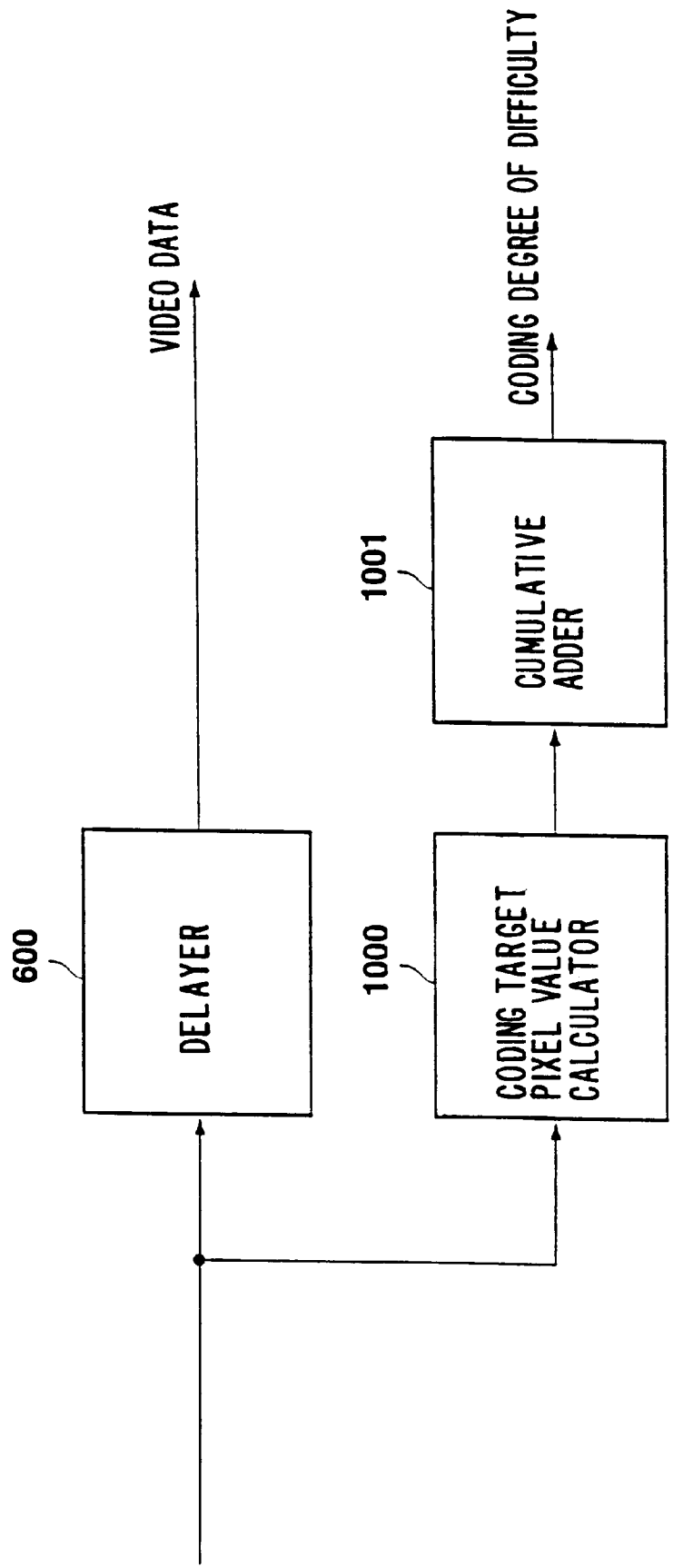
FIG. 11 is a block diagram showing an example of a further configuration of the video coding degree of difficulty measurer of FIG. 6.

FIG. 11 is a block diagram showing an example of a further configuration for the video coding difficulty measurer 500V-1. Portions in FIG. 11 that are the same as portions in FIG. 7 are given the same numerals and their description is omitted.

In FIG. 11, a coding target pixel value calculator 1000 obtains the pixel value for each one GOP portion of pixel data inputted. Namely, the pixel values (values showing the luminance of a pixel) for the plurality of pixels comprising one frame (image) of picture data are obtained and outputted. Further, a cumulative adder 1001 performs accumulative addition after the coding target pixel value provided from the coding target pixel value calculator 1000 has been squared and these results are outputted as the coding difficulty for one GOP portion of video data.

The inputted video data is supplied to the delay part 600 and the coding target pixel value calculator 100. The delay part 600 accumulates the data for one GOP portion of data. When the first frame (image) of the GOP is inputted to the delay part 600, the coding target pixel value calculator 1000 starts calculating pixel values, with these calculations continuing until the inputting of the frame for the final GOP. The cumulative adder 1001 cumulatively adds the individual pixels with a squared value across one GOP and outputs the arithmetic results as the coding difficulties. The video data for the first frame of the GOP corresponding to this coding difficulty is then outputted while these arithmetic results are being outputted.

According to this configuration, the coding difficulty of video data for one GOP period can be easily obtained.

Figure 12:
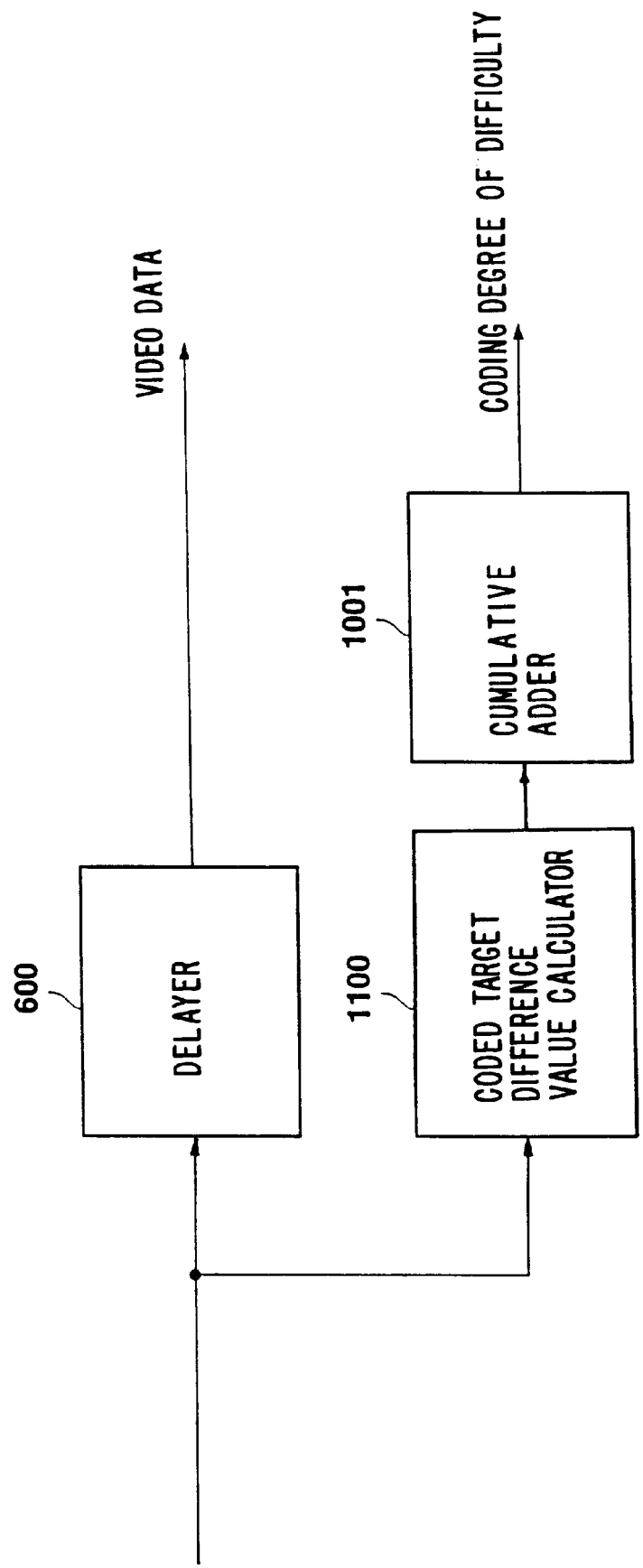
FIG. 12 is a block diagram showing an example of a still further configuration of the video coding degree of difficulty measurer of FIG. 6.

FIG. 12 is a block diagram showing an example of a further configuration of the video coding difficulty measurer 500V-1. In FIG. 12, portions that are the same as portions in FIG. 7 and FIG. 11 are given the same numerals and their description is omitted.

In FIG. 12, an coded target difference value calculator 1100 obtains a difference value for one GOP portion of inputted video data. Namely, the difference (difference value) between values of certain pixels comprising a certain frame and the pixel values of pixels at the corresponding position for the next frame is obtained for all of the pixels in one frame. The cumulative adder 1001 then performs cumulative addition after squaring the coding target difference value supplied from the coded target difference value calculator 1100 and outputs the result as the coding difficulty for one GOP portion of video data.

If the pixel difference value is excluded, the operation of this example configuration is such that the data outputted from the coded target difference value calculator 1100 is the same as the case in FIG. 11 and a description is therefore omitted.

A coding difficulty can therefore also be easily obtained with this configuration in the same way as for the aforementioned example configuration shown in FIG. 11.

At the cumulative adder 1001 shown in FIG. 11 and FIG. 12, the squared values or the pixel values or difference values outputted from the coding target pixel value calculator 1000 or the coded target difference value calculator 1100 are cumulatively added. However, it is also possible to cumulatively add the absolute values of the pixel values or the difference values. According to this kind of configuration, the coding difficulty can be obtained even more easily because multiplication is not carried out.

According to the coding device and the coding method of the present invention, coding is controlled in such a manner that degrees of difficulty of coding a plurality of data are measured, the plurality of data items are coded in accordance with the respective degrees of difficulty, the coded plurality of data is combined and the combined data becomes of a fixed bit rate. Coding at a bit rate that is in accordance with the amount of information for the respective data items is then possible.

Further, according to the transmission device and transmission method of the present invention, coding is controlled in such a manner that degrees of difficulty of coding a plurality of data are measured, the plurality of data items are coded in accordance with the respective degrees of difficulty, the coded plurality of data is combined and the combined data becomes of a fixed bit rate, with the combined data then being outputted via a transmission path. It is therefore possible to allot bit rates in accordance with the amount of information for each data item without the bit rate of the combined data exceeding the maximum bit rate for the transmission path.

With the coding difficulty measurer of the embodiment of the present invention, the degree of difficulty of coding video is obtained in GOP units and the degree of difficulty of coding audio is obtained in audio frame units. The present invention is, however, by no means limited in this respect and any units may be used for obtaining the degree of difficulty of coding that do not change the scope of the present invention are possible.

Further, the embodiment of the present invention is realized by the hardware shown in the block diagrams but the present invention is by no means limited in this respect and may also be realized by software using a CPU and/or memory etc.

Moreover, various modifications and applications can be considered that do not deviate from the main points of the present invention. As a result, the main points of the present invention are by no means limited to the embodiment.

What is claimed is:

1. A coding device for coding a plurality of different data streams using one or more prescribed coding systems, multiplexing, and then outputting a plurality of said different data streams as being coded, said coding device comprising:

measuring means for measuring degrees of difficulty of coding a plurality of said different data streams;

deciding means for deciding coding rates for a plurality of said different data streams in accordance with a target bit rate and said degrees of difficulty of coding for a plurality of said different data streams in such a manner that the bit rate of said data being outputted becomes equal to said target bit rate;

coding means for coding a plurality of said different data streams in response to each of said coding rates being decided; and multiplexing means for multiplexing a plurality of said different data streams coded by said coding means.

2. A coding device according to claim 1, wherein a plurality of said data includes at least a plurality of video data.

3. A coding device according to claim 2, wherein a plurality of said data further includes audio data.

4. A coding device according to claim 3, wherein said audio data is measured by said measuring means with respect to said degree of difficulty of coding in audio frame unit.

5. A coding device according to claim 3, wherein said audio data provides said degree of difficulty of coding as an amount of codes when said audio data is coded at prescribed quantization step sizes.

6. A coding device according to claim 2, wherein said video data is measured by said measuring means with respect to said degrees of difficulty of coding in Group Of Picture unit.

7. A coding device according to claim 2, wherein said video data provides said degree of difficulty of coding as an amount of codes when said video data is coded at a prescribed quantization step size.

8. A coding device according to claim 2, wherein said video data provides said degree of difficulty of coding as a cumulative addition of squares of one of coding target pixel values and difference values of said coding target pixel values.

9. A coding device according to claim 2, wherein said video data provides said degree of difficulty of coding as a cumulative addition of one of coding target pixel values and absolute values of difference values of said coding target pixel values.

10. A coding device according to claim 1, wherein said prescribed coding system is a Moving Picture Experts Group system.

11. A coding device for coding a plurality of data using one or more prescribed coding systems, multiplexing, and then outputting a plurality of said data as being coded, said coding device comprising:

measuring means for measuring degrees of difficulty of coding a plurality of said data;

deciding means for deciding coding rates for a plurality of said data in accordance with a target bit rate and said degrees of difficulty of coding for a plurality of said data in such a manner that the bit rate of said data being outputted becomes equal to said target bit rate;

coding means for coding a plurality of said data in response to each of said coding rates being decides wherein said coding rate for each of a plurality of said data is decided by allotting said target bit rate with a ratio of said degree of difficulty of coding for said each of a plurality of said data to a cumulative addition of said degrees of difficulty of coding; and multiplexing means for multiplexing a plurality of said data coded by said coding means.

12. A coding method for coding a plurality of different data streams multiplexing, and then outputting a plurality of said different data streams as being coded, said coding method comprising the steps of:

measuring degrees of difficulty of coding a plurality of said different data streams;

deciding coding rates for a plurality of said different data streams in accordance with a target bit rate and said degrees of difficulty of coding for a plurality of said different data streams in such a manner that a bit rate of said data being outputted becomes equal to said target bit rate;

coding a plurality of said different data streams in response to each of said coding rate being decided; and multiplexing a plurality of said different data streams coded in said step of coding.

13. A coding method according to claim 12, wherein a plurality of said data includes at least a plurality of video data.

14. A coding method according to claim 13, wherein a plurality of said data further includes audio data.

15. A coding method according to claim 14, wherein said audio data is measured by said measuring means with respect to said degree of difficulty of coding in audio frame unit.

16. A coding method according to claim 14, wherein said audio data provides said degree of difficulty of coding as an amount of codes when said audio data is coded at prescribed quantization step sizes.

17. A coding method according to claim 13, wherein said video data is measured by said measuring means with respect to said degrees of difficulty of coding in Group Of Picture unit.

18. A coding method according to claim 13, wherein said video data provides said degree of difficulty of coding as an amount of codes when said video data is coded at a prescribed quantization step size.

19. A coding method according to claim 13, wherein said video data provides said degree of difficulty of coding as a cumulative addition of squares of one of coding target pixel values and difference values of said coding target pixel values.

20. A coding method according to claim 13, wherein said video data provides said degree of difficulty of coding as a cumulative addition of one of coding target pixel values and absolute values of difference values of said coding target pixel values.

21. A coding method according to claim 12, wherein said prescribed coding system is a Moving Picture Experts Group system.

22. A coding method for coding a plurality of data multiplexing, and then outputting a plurality of said data as being coded, said coding method comprising the steps of:

measuring degrees of difficulty of coding a plurality of said data;

deciding coding rates for a plurality of said data in accordance with a target bit rate and said degrees of difficulty of coding for a plurality of said data in such a manner that a bit rate of said data being outputted becomes equal to said target bit rate;

coding a plurality of said data in response to each of said coding rate being decided wherein said coding rate for each of a plurality of said data is decided by allotting said target bit rate with a ratio of said degree of difficulty of coding for said each of a plurality of said data to a cumulative addition of said degrees of difficulty of coding; and multiplexing a plurality of said data coded in said step of coding.

23. A transmission device for coding a plurality of different data streams using one or more prescribed coding systems, multiplexing, and then transmitting a plurality of said different data streams being coded, said coding device comprising:

measuring means for measuring degrees of difficulty of coding a plurality of said different data streams;

deciding means for deciding coding rates for a plurality of said different data streams in accordance with a target bit rate and said degrees of difficulty of coding for a plurality of said different data streams in such a manner that the bit rate of said data being outputted becomes equal to said target bit rate;

coding means for coding a plurality of said different data streams in response to each of said coding rates being decided;

multiplexing means for multiplexing a plurality of said different data streams coded by said coding means; and transmission means for transmitting said data being multiplexed.

24. A transmission device according to claim 23, wherein a plurality of said data includes at least a plurality of video data.

25. A transmission device according to claim 24, wherein a plurality of said data further includes audio data.

26. A transmission device according to claim 25, wherein said audio data is measured by said measuring means with respect to said degree of difficulty of coding in audio frame unit.

27. A transmission device according to claim 25, wherein said audio data provides said degree of difficulty of coding as an amount of codes when said audio data is coded at prescribed quantization step sizes.

28. A transmission device according to claim 24, wherein said video data is measured by said measuring means with respect to said degrees of difficulty of coding in Group Of Picture unit.

29. A transmission device according to claim 24, wherein said video data provides said degree of difficulty of coding as an amount of codes when said video data is coded at a prescribed quantization step size.

30. A transmission device according to claim 24, wherein said video data provides said degree of difficulty of coding as a cumulative addition of squares of one of coding target pixel values and difference values of said coding target pixel values.

31. A transmission device according to claim 24, wherein said video data provides said degree of difficulty of coding as a cumulative addition of one of coding target pixel values and absolute values of difference values of said coding target pixel values.

32. A transmission device according to claim 23, wherein said prescribed coding system is a Moving Picture Experts Group system.

33. A transmission device for coding a plurality of data using one or more prescribed coding systems, multiplexing, and then transmitting a plurality of said data being coded, said coding device comprising:

measuring means for measuring degrees of difficulty of coding a plurality of said data;

deciding means for deciding coding rates for a plurality Of said data in accordance with a target bit rate and said degrees of difficulty of coding for a plurality of said data in such a manner that the bit rate of said data being outputted becomes equal to said target bit rate;

coding means for coding a plurality of said data in response to each of said coding rates being decided wherein said coding rate for each of a plurality of said data is decided by allotting said target bit rate with a ratio of said degree of difficulty of coding for said each of a plurality of said data to a cumulative addition of said degrees of difficulty of coding;

multiplexing means for multiplexing a plurality of said data coded by said coding means; and transmission means for transmitting said data being multiplexed.

34. A transmission method for transmitting a plurality of said different data streams which are coded and multiplexed before being transmitted, said transmission method comprising the steps of:

measuring degrees of difficulty of coding a plurality of said different data streams;

deciding coding rates for a plurality of said different data streams in accordance with a target bit rate and said degrees of difficulty of coding for a plurality of said different data streams in such a manner that a bit rate of said data being outputted becomes equal to said target bit rate;

coding a plurality of said different data streams in response to each of said coding rates being decided;

multiplexing a plurality of said different data streams coded in said step of coding; and transmitting said data being multiplexed.

35. A transmission method according to claim 34, wherein a plurality of said data includes at least a plurality of video data.

36. A transmission method according to claim 35, wherein a plurality of said data further includes audio data.

37. A transmission method according to claim 35, wherein said video data is measured by said measuring means with respect to said degrees of difficulty of coding in Group Of Picture unit.

38. A transmission method according to claim 35, wherein said video data provides said degree of difficulty of coding as an amount of codes when said video data is coded at a prescribed quantization step size.

39. A transmission method according to claim 35, wherein said video data provides said degree of difficulty of coding as a cumulative addition of squares of one of coding target pixel values and difference values of said coding target pixel values.

40. A transmission method according to claim 35, wherein said video data provides said degree of difficulty of coding as a cumulative addition of one of coding target pixel values and absolute values of difference values of said coding target pixel values.

41. A transmission method according to claim 35, wherein said audio data is measured by said measuring means with respect to said degree of difficulty of coding in audio frame unit.

42. A transmission method according to claim 35, wherein said audio data provides said degree of difficulty of coding as an amount of codes when said audio data is coded at prescribed quantization step sizes.

43. A transmission method according to claim 34, wherein said prescribed coding system is a Moving Picture Experts Group system.

44. A transmission method for transmitting a plurality of said data which are coded and multiplexed before being transmitted, said transmission method comprising the steps of:

measuring degrees of difficulty of coding a plurality of said data;

deciding coding rates for a plurality of said data in accordance with a target bit rate and said degrees of difficulty of coding for a plurality of said data in such a manner that a bit rate of said data being outputted becomes equal to said target bit rate;

coding a plurality of said data in response to each of said coding rates being decided wherein said coding rate for each of a plurality of said data is decided by allotting said target bit rate with a ratio of said degree of difficulty of coding for said each of a plurality of said data to a cumulative addition of said degrees of difficulty of coding;

multiplexing a plurality of said data coded in said step of coding; and transmitting said data being multiplexed.

45. A method of providing a multiplexed data of a plurality of different data streams for being recorded in a recording medium which stores coded data including said multiplexed data as being decodable, said method comprising the steps of:

measuring degrees of difficulty of coding a plurality of said different data streams;

deciding coding rates for a plurality of said data in accordance with a target bit rate and said degrees of difficulty of coding for a plurality of said different data streams in such a manner that a bit rate of said data to be recorded in said recording medium becomes equal to said target bit rate;

coding a plurality of said different data streams in accordance with a prescribed coding system in response to each of said coding rate being decided;

multiplexing a plurality of said different data streams coded in said step of coding; and outputting said multiplexed data for being recorded in said recording medium.

* * * * *